United States Patent
Claxton

(10) Patent No.: US 6,434,371 B1
(45) Date of Patent: *Aug. 13, 2002

(54) SELECTING FLIP PHONE OPERATING MODE USING FLIP POSITION

(75) Inventor: Daniel Claxton, Rancho Sante Fe, CA (US)

(73) Assignee: Qualcomm, Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/565,681

(22) Filed: May 5, 2000

Related U.S. Application Data

(60) Provisional application No. 60/132,821, filed on May 6, 1999.

(51) Int. Cl.[7] .............................................. H04M 1/02
(52) U.S. Cl. ........................ 455/90; 455/556; 455/575; 379/433.01
(58) Field of Search .................................... 455/556, 557, 455/90, 575, 66, 74, 550; 379/433.01

(56) References Cited

U.S. PATENT DOCUMENTS 6,115,620 A * 9/2000 Colonna et al. ............ 455/569

FOREIGN PATENT DOCUMENTS

| EP | 0 796 026 A2 | 9/1997 |
| GB | 2 337 899 A | 12/1999 |
| WO | WO 98/19434 | 5/1998 |

* cited by examiner

*Primary Examiner*—Lee Nguyen
(74) *Attorney, Agent, or Firm*—Philip R. Wadsworth; Charles D. Brown; Howard H. Seo

(57) ABSTRACT

A flip cover and hinge operate as a rotary switch to select the mode of operation of a communications device. Multiple contacts are located on the sides of the inner surface of the flip cover and a single contact is located on each side of the body of the communications device. Each contact located on the sides of the inner surface of the flip cover represents a different mode of operation for the communications device. As the flip cover rotates from a closure position to its final position as a stand, the mode of operation of the communications device changes as the contact from the body of the communications device connects with one of the contacts on the flip cover. Three modes of operation are presently implemented: the KEYPAD mode, the SMARTPHONE mode, and the SPEAKERPHONE mode.

33 Claims, 7 Drawing Sheets

SELECTING FLIP PHONE OPERATING MODE USING FLIP POSITION

CROSS-REFERENCE TO OTHER APPLICATIONS

This application claims priority from Provisional application Ser. No. 60/132,821, filed May 6, 1999.

The following applications of common assignee contain some common disclosure as the present application:

U.S. Patent Application entitled "Detection of Flip Closure State of a Flip Phone", filed May 5, 2000, Ser. No. 09/565,684.

U.S. Patent Application entitled "Two-Pin Connection for Portable Phone Keypad", filed May 5, 2000, Ser. No. 09/565,683.

U.S. Patent Application entitled "A/D Converter Sharing for Keypad and Touch Panel of a Phone", filed May 1, 2000, Ser. No. 09/565,682.

U.S. Patent Application entitled "Flip Phone With PDA and Mode Selection", filed May 5, 2000, Ser. No. 09/565,685.

BACKGROUND OF THE INVENTION

1. Field of the Invention

The present invention relates generally to the field of mobile communications.

More particularly, the present invention relates to a system and method for selecting the operating mode of a communications device using the relative position of the flip cover with the body of the communication device.

2. Related Art

Many mobile communications devices are now combining wireless phone technology with hand-held computer platforms that provide personal information management. Such hand-held computer devices are called personal digital assistants (PDAs). Combination mobile communications devices usually operate as two separate instruments, requiring separate liquid crystal displays (LCDs) and additional circuitry to read the separate input devices of the wireless phone and the PDA.

Matrix encoded keyboards and keypads are used extensively as input devices for computers and telephones. Such keyboards and keypads are usually mounted on a flex circuit and require multiple signal paths (that is, wires or conductive traces) to detect which key is pressed. For example, a 4 by 4 matrix keypad, which contains sixteen input keys, requires eight signal paths. When the keyboard or keypad is implemented on a flip cover, as may be the case with a wireless phone or PDA, multiple signal paths are routed to the body of the communications device through a hinge. The routing of multiple signal paths through a hinge causes the instrument to be less durable and may lead to the breakage of the hinge or the flex circuit if the instrument is constantly picked up by grasping the flip cover.

Many PDAs require a two-channel analog-to-digital converter (ADC) to read the touch panel display. When the PDA is combined with a wireless telephone that implements the keypad on a flip cover, additional circuitry usually includes an additional ADC to read the keypad on the flip cover and an additional LCD for the wireless telephone display.

What is needed is an efficient and cost effective way to integrate a PDA and wireless telephone with a flip cover that is lightweight, durable, and easy to operate. What is further needed is the integration of a PDA and wireless telephone that provides a user-friendly mechanism for changing the mode of operation of the device.

SUMMARY OF THE INVENTION

The present invention satisfies the above mentioned needs by providing a communications device that efficiently integrates a flip telephone with a PDA. The present invention operates as a single unit. According to a first embodiment of the present invention, the opening and closing of the flip cover activates a switch that changes the operating mode of the communications device. The communications device operates as a combination wireless telephone and personal digital assistant (PDA) when the flip cover is open. This is called the SMARTPHONE mode of operation. When the flip cover is closed, the communications device operates as a standard wireless telephone. This is known as the KEYPAD mode of operation.

According to a second embodiment of the present invention, the flip cover and hinge operate as a rotary switch to select the mode of operation of the communications device. Multiple contacts are located on the sides of the inner surface of the flip cover and a single contact is located on each side of the body of the communications device. Each contact located on the sides of the inner surface of the flip cover represents a different mode of operation for the communications device. As the flip cover rotates from the closed position to its final position as a stand, the mode of operation of the communications device changes as th contact from the body of the communications device connects with one of the contacts on the flip cover. Three modes of operation are presently implemented: the KEYPAD mode, the SMARTPHONE mode, and the SPEAKERPHONE mode.

The third embodiment of the present invention is a detection circuit that detects the open and closed state of the flip cover. The detection circuit includes a resistive network and an analog-to-digital converter (ADC). When the flip cover is in the closed position, the circuit detects a unique resistive value through a set of contacts. This voltage level is converted from an analog signal to a digital signal via the ADC for input into a microprocessor. When the flip cover is in the open position, the contacts are broken, thus, disabling the detection of the unique resistive value. The resulting voltage level is converted from an analog signal to a digital signal via the ADC for input into a microprocessor. Software, programmed within the microprocessor, enables the communications device to operate in the appropriate mode according to the detection of the open/close state of the flip cover.

Further features and advantages of the invention, as well as the structure and operation of various embodiments of the invention, are described in detail below with reference to the accompanying drawings.

BRIEF DESCRIPTION OF THE FIGURES

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

The present invention is directed toward a communications device comprising a combination flip telephone and personal digital assistant (PDA). The present invention operates as a standard cellular telephone when the flip cover is in the closed position. This mode of operation is referred to as the KEYPAD mode. The present invention also operates as a PDA and telephone when the flip cover is in the open position. This mode of operation is referred to as the SMARTPHONE mode. A first embodiment of the present invention implements a switch that is controlled by the opening and closing of the flip cover to establish the modes of operation of the combination flip telephone and PDA. In a second embodiment of the present invention, the flip cover and hinge act as a rotary switch to control the selection of the mode of operation of the communications device. In a third embodiment, the detection of the open/close state of the flip cover is accomplished using a detection circuit that detects the presence of a resistive circuit.

Figure 1:
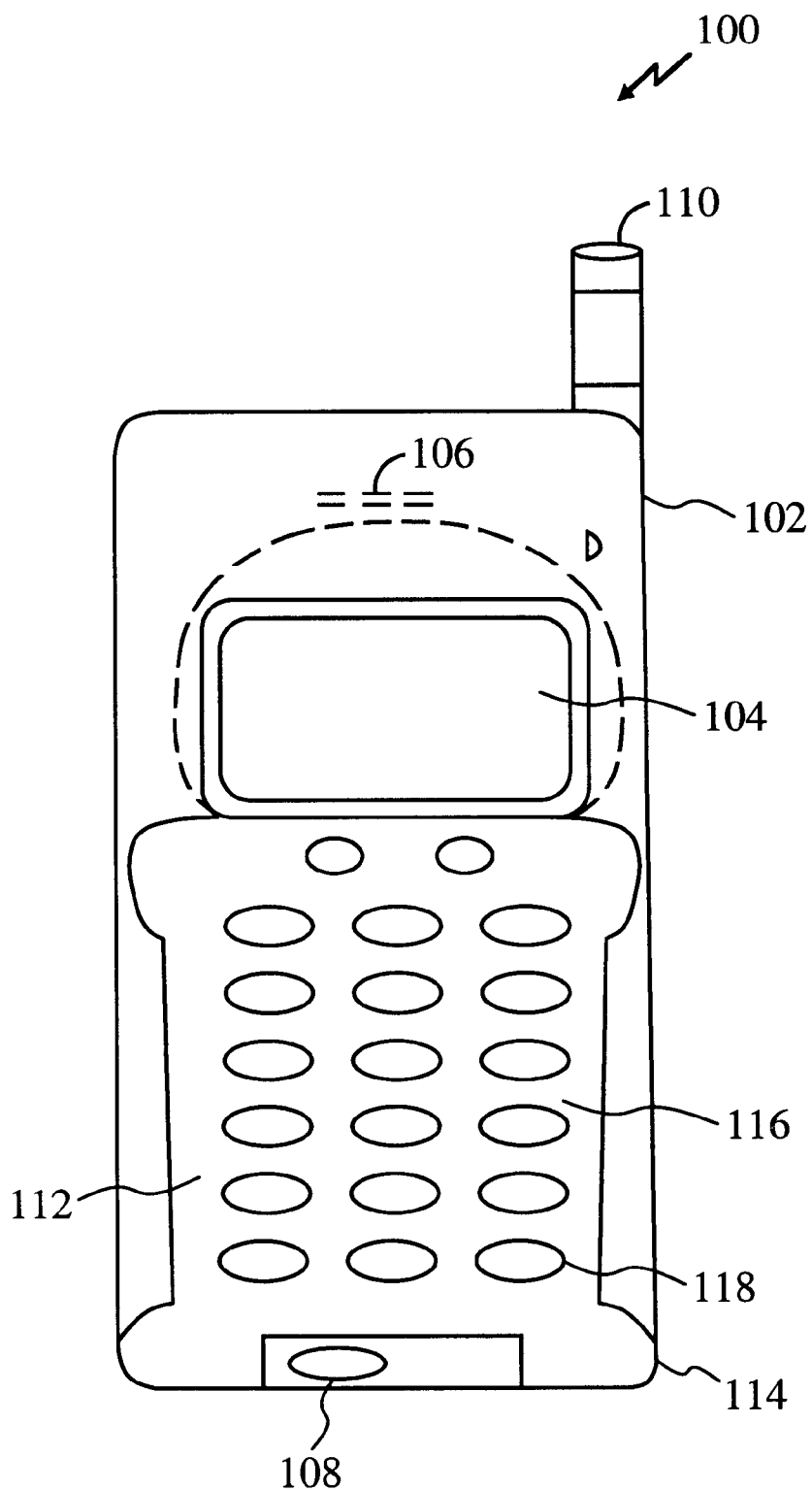
FIG. 1 is a diagram illustrating the communications device with the flip cover in the closed position.

FIG. 1 illustrates a front view of a communications device 100 with the flip cover in the closed position, i.e., KEYPAD mode. Communications device 100 comprises a body 102 and a flip cover 112. Body 102 comprises a liquid crystal display (LCD) 104, a speaker 106, a microphone 108, and an antenna 110. Flip cover 112 comprises a flip hinge 114, an exterior surface 116, and an interior surface 208 (shown in FIG. 2). Flip hinge 114 is a jointed device that enables flip cover 112 to open and close by rotating flip cover 112 about flip hinge 114. Flip hinge 114 also allows flip cover 112 to be removably detached from the body 102 of the communications device 100. Exterior surface 116 of flip cover 112 contains a keypad 118. Keypad 118 is a standard telephone keypad that is well known in the relevant art(s).

When flip cover 112 is closed, only a portion of LCD display 104 is exposed. This portion of LCD display 104 is used to display various telephone functions, such as the date, time, redial function and a menu. Also displayed is a signal strength indicator and a digital indicator. The signal strength indicator indicates the strength of the signal being received via antenna 110. The digital indicator indicates that the telephone is operating in digital mode. Microphone 108 and speaker 106 are used to convert variations in sound pressure, i.e., voice, to variations in electrical signals or variations in electrical signals into variations in sound pressure, i.e., voice, respectively. Antenna 110 is used to receive and transmit signals being sent to and from communications device 100.

Figure 2:
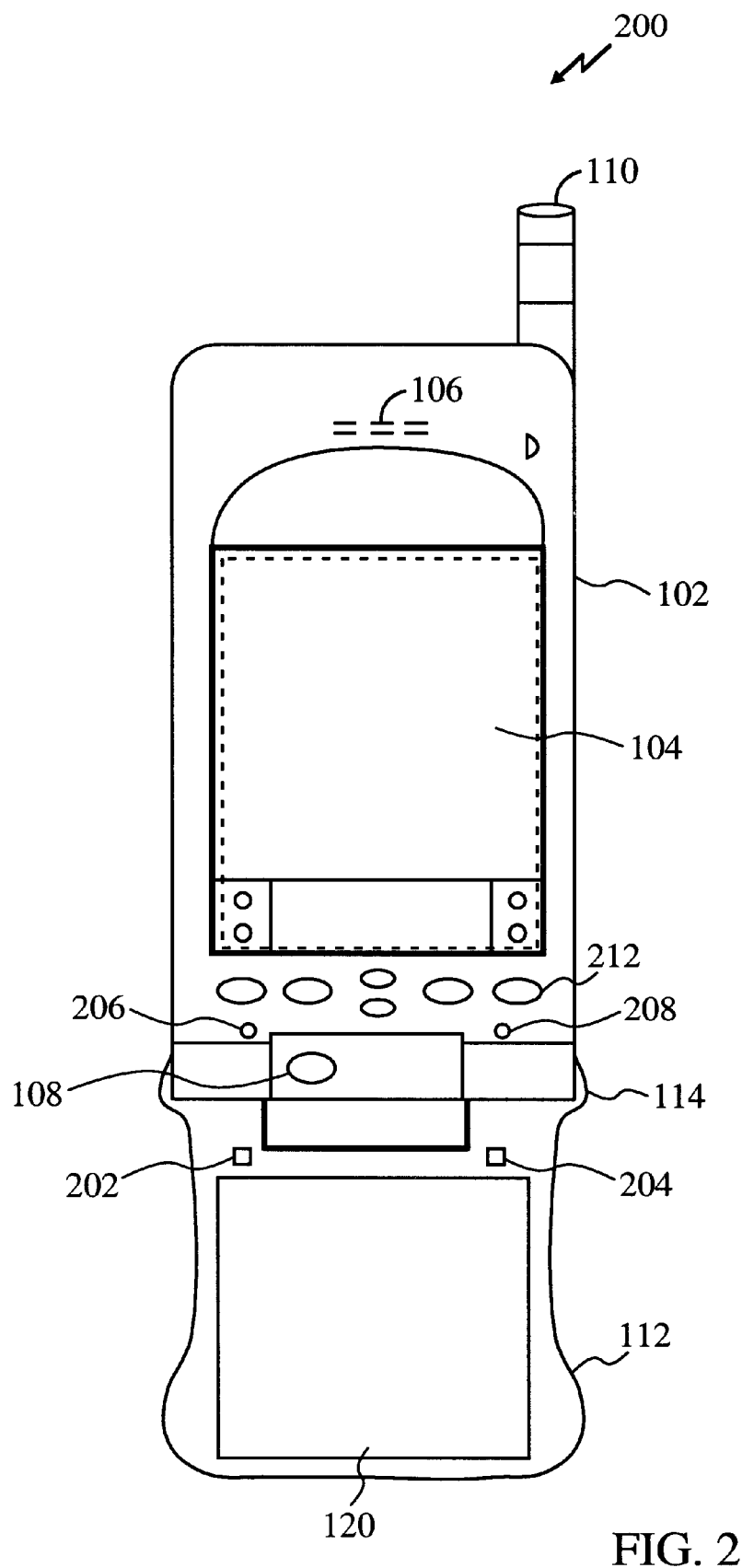
FIG. 2 is a diagram of an embodiment of the communications device with the flip cover in the open position.

FIG. 2 illustrates a front view of communications device 100 with the flip cover in the open position, i.e., SMARTPHONE mode. Body 102 of the communications device 100 displays a full view of LCD 104. The top portion of LCD 104 is used to display the functions of a telephone while the bottom portion of LCD 104 displays functions related to the PDA. Such functions include all of the personal management functions found on the Palm™ III organizer, such as date book, address book, to-do list, expense management, calculator, note-taking, and games, and e-mail, web, and Alert Manager functions. Body 102 of communications device 100 also contains PDA buttons 202, a first spring loaded pogo pin 204, and a second spring loaded pogo pin 206. PDA buttons 202 allow for user input into a microprocessor (shown in FIGS. 6 and 7). Notice that microphone 108 is exposed when flip cover 112 is in both the closed and open positions. This is due to the open rectangular space 122 at the bottom of flip cover 112.

Interior surface 208 of flip cover 112 contains a first contact 210 and a second contact 212. When flip cover 112 is in the closed position, first contact 210 electrically connects with first spring loaded pogo pin 204 and second contact 212 electrically connects with second spring loaded pogo pin 206 to allow for user input from keypad 118 to the microprocessor (shown in FIG. 7).

Flip Phone with PDA and Mode Selection

Figure 3:
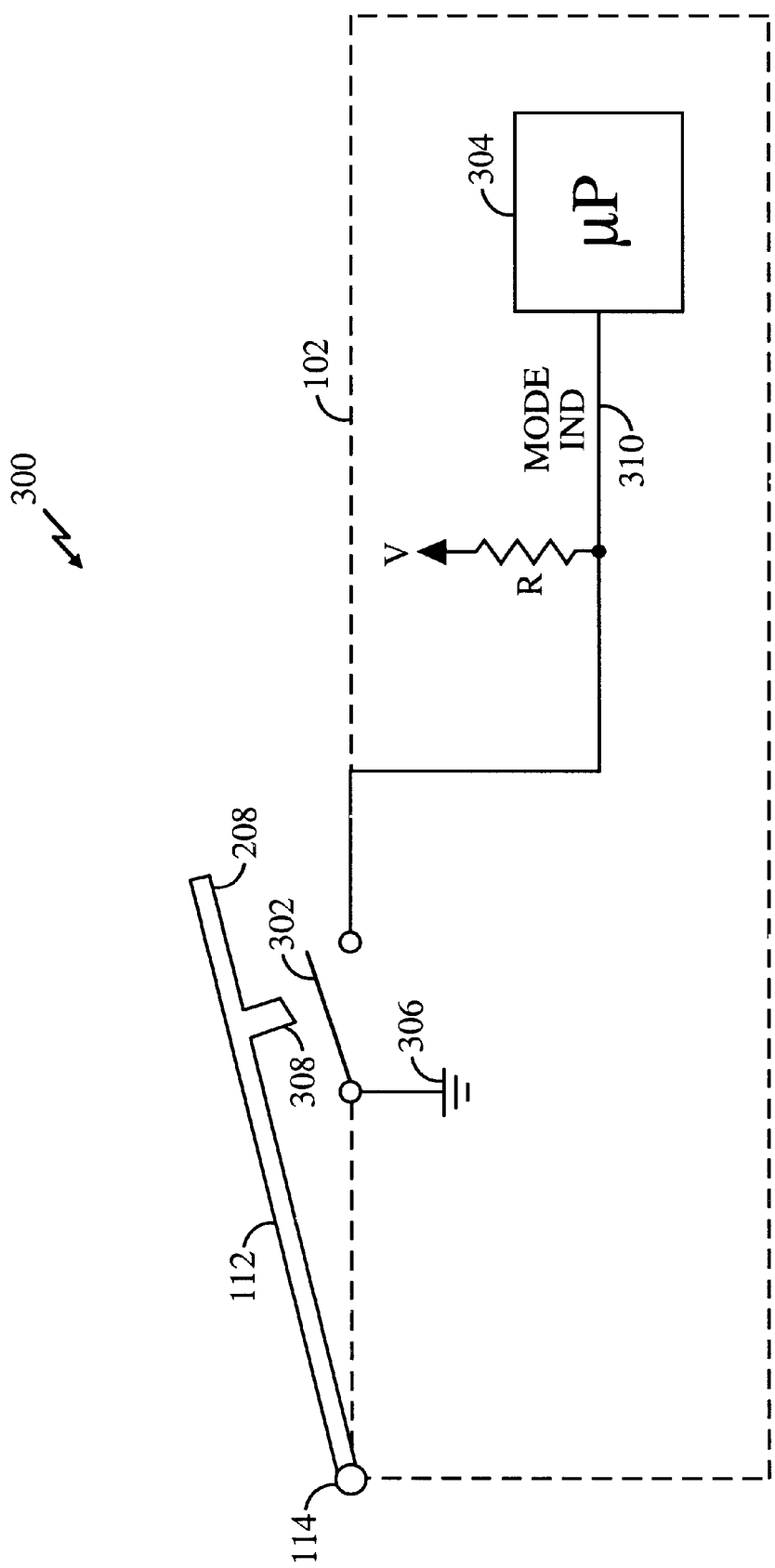
FIG. 3 is a circuit diagram illustrating a mechanism for changing the mode of operation of the communication device using the flip cover.

The present invention determines the operating mode of the flip telephone and PDA by activating a switch. The present invention activates the switch using flip cover 112 of the communications device 100. FIG. 3 represents a diagram of a circuit 300 that detects the operating mode of communications device 100. Circuit 300 includes flip cover 112 and body 102 of communications device 100. Communications device 100 includes a switch 302, a microprocessor 304, and a pull-up resistor R. One end of switch 302 is connected to a ground 306. The other end of switch 302 is connected to microprocessor 304. Pull-up resistor R is connected to a voltage source V on one end and to microprocessor 304 and switch 302 on the opposite end. Voltage source V is approximately +3.3 volts and resistor R is approximately 100 K ohms. After reading the description, it will be apparent to a person skilled in the relevant art(s) to implement the invention using other values for V and R without departing from the spirit and scope of the invention.

Interior surface 208 of flip cover 112 includes a plastic piece 308. Plastic piece 308 engages switch 302 when flip cover 112 is in the closed position. When flip cover 112 is in the closed position, plastic piece 308 causes switch 302 to be in a closed position and thus pulls an operating mode indicator signal 310 to a low level. Plastic piece 308 disengages switch 302 when flip cover 112 is in the open position. When flip cover 112 is in the open position, the disengagement of plastic piece 308 causes switch 302 to open, and voltage source V, through pull-up resistor R, causes operating mode indicator signal 310 to input a high level into microprocessor 304. Operating mode indicator signal 310 indicates the present mode of operation of communications device 100 to microprocessor 304. When operating mode indicator signal 310 is true (high), it causes the software running on microprocessor 304 to operate communications device 100 in the SMARTPHONE mode. When operating mode signal 310 is false (low), it causes the software running on microprocessor 304 to operate communications device 100 in the KEYPAD mode. One skilled in the particular art(s) would be able to construct the software running on microprocessor 304 with ease.

Selecting Flip Telephone Operating Mode Using the Flip Position

One can also engage different modes of operation for communications device 100 based on the position of flip cover 112. In another embodiment of the present invention, shown in FIG. 4, the flip cover and the hinge act as a rotary switch to control the selection of the mode of operation of communications device 100. Multiple contacts are positioned on the sides of interior surface 208 of flip cover 112 while a single contact is positioned on both sides of body 102 of communications device 100. As flip cover 112 rotates about hinge 114, the contacts on the inside of flip cover 112 make a connection with the contacts on the side of body 102 of communications device 100, each connection indicating a different mode of operation. In the preferred embodiment, three contacts are positioned on each side of interior surface 208 of flip cover 112. The three modes of operation represented by the three contacts 402, 404, and 406 are KEYPAD mode, SMARTPHONE mode, and SPEAKERPHONE mode, respectively. One skilled in the relevant art(s) will recognize that the multiple contacts could be placed on body 102 of communications device 100 and a single contact could be placed on each side of the inside of flip cover 112 without departing from the scope of the present invention.

Figure 4:
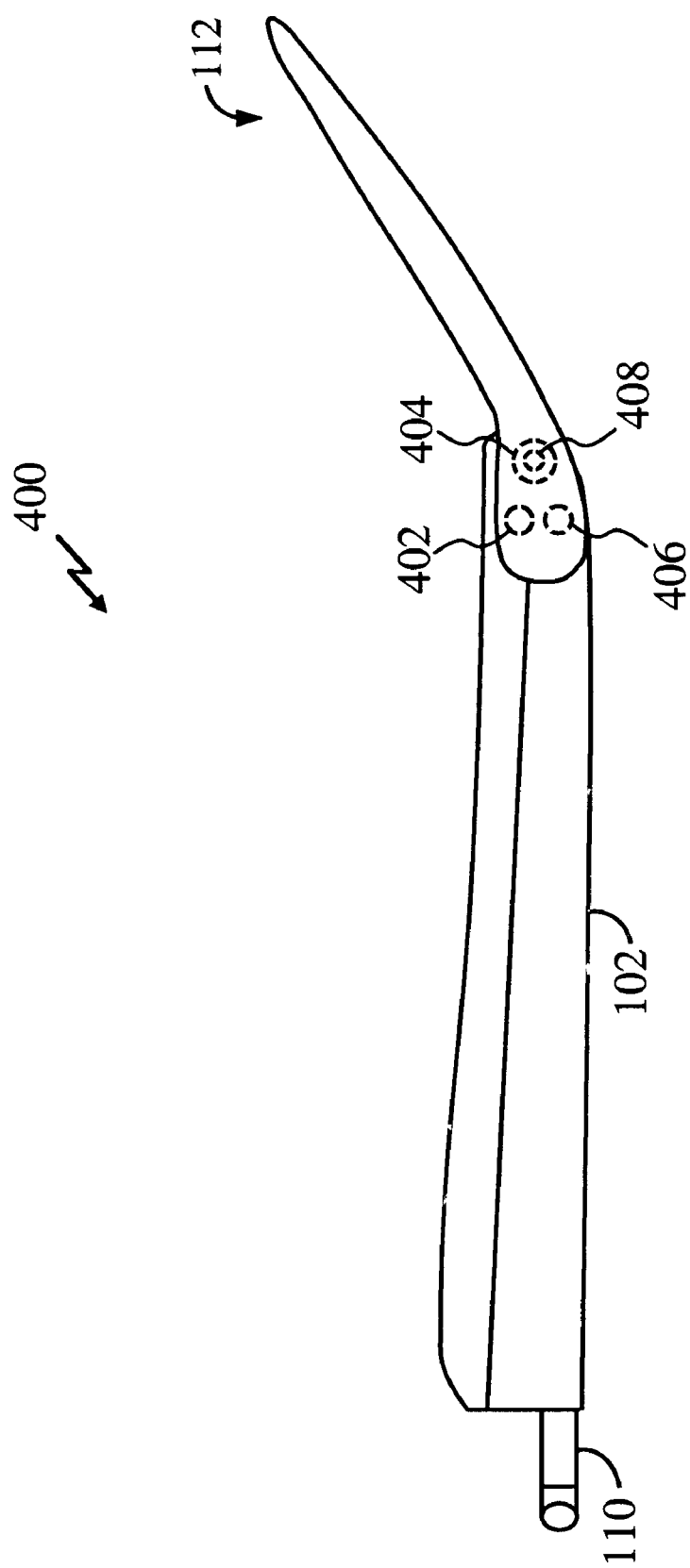
FIG. 4 is a diagram of a side view of an embodiment of the present invention that employs multiple contacts on the side of the interior surface of the flip cover to determine the operating mode of the communications device.
Figure 5:
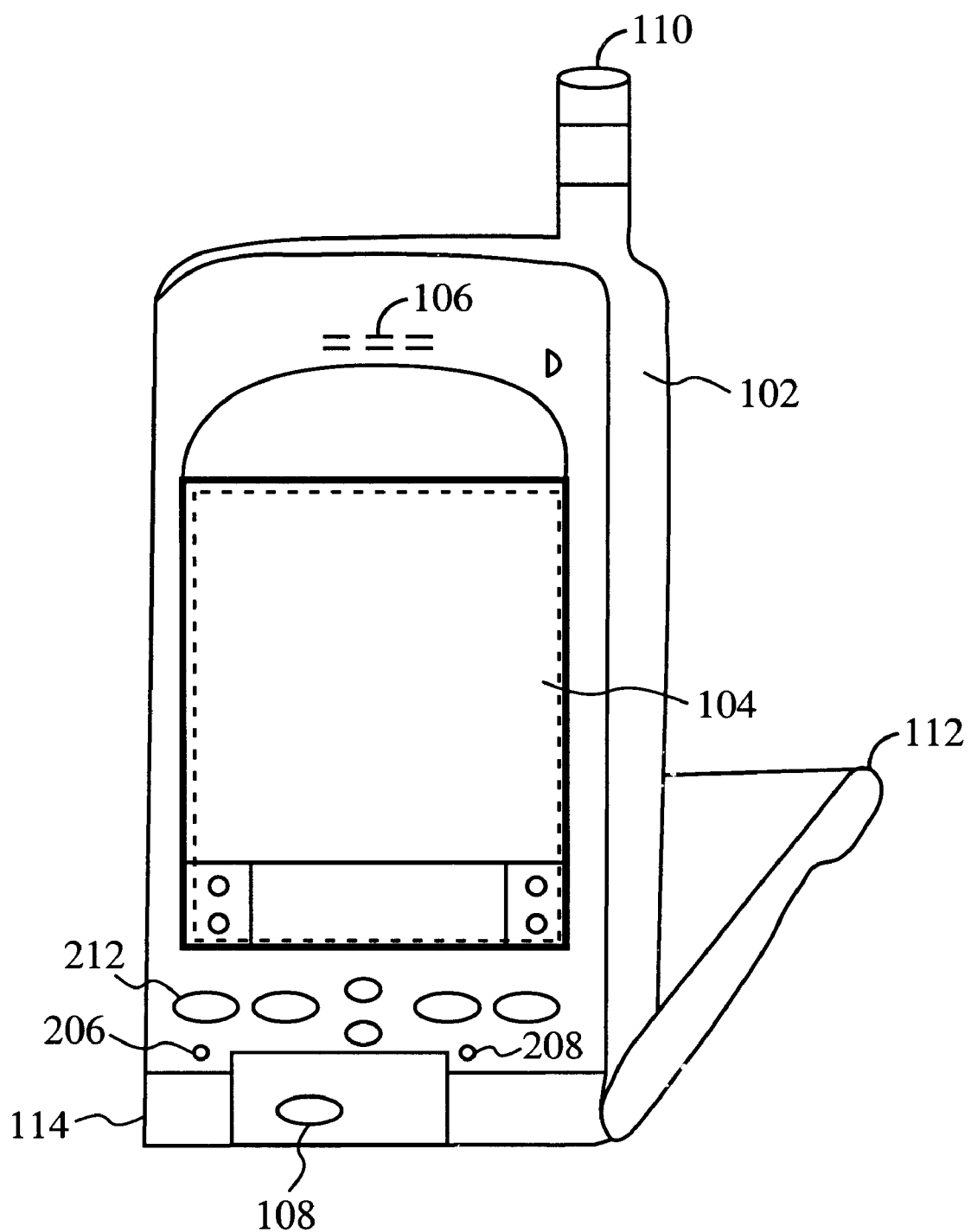
FIG. 5 is a diagram of the communications device utilizing the flip cover as a stand.

FIG. 4 is a side view of an embodiment of the present invention that enables different modes of operation based on the position of flip cover 112. The inside of flip cover 112 contains three contacts 402, 404, and 406 (shown in phantom as circles) on one side and three contacts 610, 612, 614 (shown in FIG. 6) on the opposite side. A contact 408 (shown in phantom as a square) is found on body 102 of communications device 100. Another contact 616 (shown in FIG. 6) is positioned on the opposite side of body 102 of communications device 100. With this embodiment, the present invention operates as a standard telephone in the KEYPAD mode, a PDA and telephone in the SMARTPHONE mode, and a speaker phone in the SPEAKERPHONE mode. Flip contacts 402 and 610 make connections with contacts 408 and 616, respectively, when flip cover 112 is in the closed position. This connection indicates the KEYPAD mode of operation. Flip contacts 404 and 612 make connections with contacts 408 and 616, respectively, when flip cover 112 is in the open position. This connection indicates the SMARTPHONE mode of operation. When flip contacts 406 and 614 connect with contacts 408 and 616, respectively, the mode of operation is SPEAKERPHONE mode. In SPEAKERPHONE mode flip cover 112 is folded all the way back so that flip cover 112 operates as a stand. When communications device is in SPEAKERPHONE mode, the volume of communications device 100 increases, indicating that the instrument is on the stand as opposed to being in the handheld configuration, against the side of one's face. FIG. 5 represents communications device 100 with flip cover 112 positioned as a stand.

Figure 6:
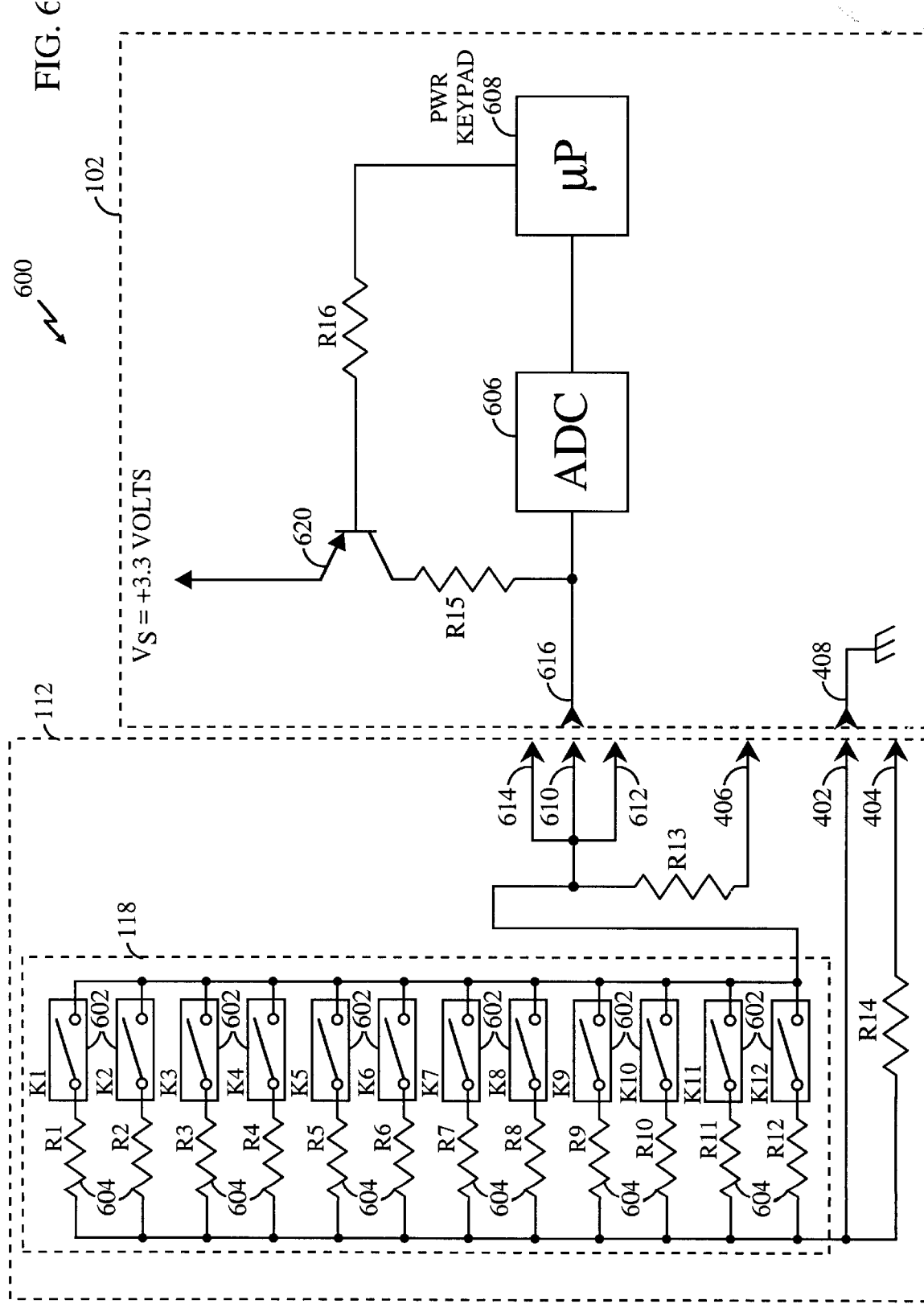
FIG. 6 is a circuit diagram illustrating mode selection using the contacts located on the side of the interior surface of the flip cover.

The circuitry that enables mode selection when contacts 402–408 and 610–616 are located on the side of flip cover 112 and communications device 100 is shown in FIG. 6. Circuit 600 includes circuitry from flip cover 112 and circuitry from body 102 of communications device 100. The circuitry from flip cover .112 connects with the circuitry from body 102 of communications device 100 via contacts 402, 404, 406, and 610 on flip cover 112 with contacts 408 and 616 on body 102 of communications device 100.

The circuitry found on flip cover 112 includes keypad 118 connected to contacts 610–614 and a resistor R13 on one side of keypad 118 and to contact 402 and a resistor R14 on the other side of keypad 118. The other side of resistor R13 is connected to contact 406. The other side of resistor R14 is connected to contact 404. Contacts 610, 612, and 614 are tied together.

The circuitry for keypad 118 is a resistive ladder network. The resistive ladder network for keypad 118 includes a plurality of keys 602 connected to a plurality of resistors 604. Each key 602 is connected to one resistor 604. Each key 602 is also implemented as a switch. When a given key 602 is pressed, the resistance 604 associated with that key 602 provides a unique voltage level representing the pressed key 602 that distinguishes the pressed key 602 from another key 602.

When flip cover 112 is positioned so that contacts 610 and 402 connect to body 102 of communications device 100, communications device 100 operates in keypad mode. The resistance associated with each key 602 is the corresponding resistance 604 directly connected to the key 602 that is pressed. For example, the resistive value associated with key K1 is resistor R1, key K2 is resistor R2, key K3 is resistor R3, and so on.

When flip cover 112 is positioned so that contacts 612 and 404 connect to body 102 of communications device 100, communications device 100 operates in the SMARTPHONE mode. The resistance associated with each key 602 is the corresponding resistance 604 directly connected to the key 602 that is pressed and the series resistance R14. For example, the resistive value associated with key K1 is resistor R1 in series with resistor R14, key K2 is resistor R2 in series with resistor R14, key K3 is resistor R3 in series with resistor R14, and so on. Thus, R14 acts as a bias by supplying an offset to keypad 118. Unless a key 602 is pressed, R14 does not come into play. When a key 602 is pressed, R14 moves the entire keypad 118 into a different range on an analog-to-digital converter 606 (shown in body 102 of communications device 100). The present embodiment, therefore, allows input from keypad 118 when communications device 100 operates in SMARTPHONE mode.

When flip cover 112 is positioned so that contacts 614 and 406 connect to body 102 of communications device 100, communications device 100 operates in the SPEAKERPHONE mode. When communications device 100 operates in the SPEAKERPHONE mode, keypad 118 is taken out of the loop, and the resistive value is now resistor R13.

The values of resistors R1 through R12 are chosen to give a unique voltage reading for each key 602 on keypad 118. R13 and R14 are also chosen to give a unique voltage reading when communications device 100 operates in SPEAKERPHONE mode or when keys 602 are pressed and communications device 100 is operating in SMARTPHONE mode, respectively.

The circuitry from body 102 of communications device 100 includes contacts 616 and 408, analog-to-digital converter (ADC) 606, a microprocessor 608, a PNP transistor 620, and two resistors R15 and R16. Contact 408 is connected to ground. Contact 616 is connected to ADC 606 and resistor R15. Contact 616 supplies the signal from flip cover 112 to ADC 606. ADC 606 is connected to microprocessor 608. ADC 606 digitizes the analog signal for input into microprocessor 608. Microprocessor 608 outputs a signal called PWR KEYPAD to the base of PNP transistor 620 via resistor R16. PWR KEYPAD allows microprocessor 608 to turn the power to keypad 118 on and off. The emitter of PNP transistor 620 is connected to a voltage source $V_S$. $V_S$ is typically +3.3 volts, but may vary from application to application. The collector of PNP transistor 620 is connected to the other end of resistor R15.

In an alternative embodiment, R14 is located in body 102 of communications device 100.

In operation, software running on microprocessor 608 enables PWR KEYPAD to output a high voltage level to the base of PNP transistor 620 through resistor R16 to turn on PNP transistor 620. When the PNP transistor is turned on, current flows from voltage source $V_S$ through PNP transistor 620 to supply power to keypad 118. Resistor R15 is used to divide the signal being sent from flip cover 112 for input to ADC 606. Depending upon which contacts from flip cover 112 circuitry connect to the contacts on body 102 of communications device 100 determines which signal is processed by ADC 606 to be read by microprocessor 608. If flip cover 112 is detached from body 102 of communications device 100, ADC 606 would receive as input the voltage signal from $V_S$ minus the voltage drop from the emitter to the collector of PNP transistor 620 and the voltage drop across resistor R15. Microprocessor 608, via software running on microprocessor 608, determines the mode of operation from the distinct voltage levels associated with each mode of operation.

Detection of Flip Closure State of a Flip Telephone

Figure 7:
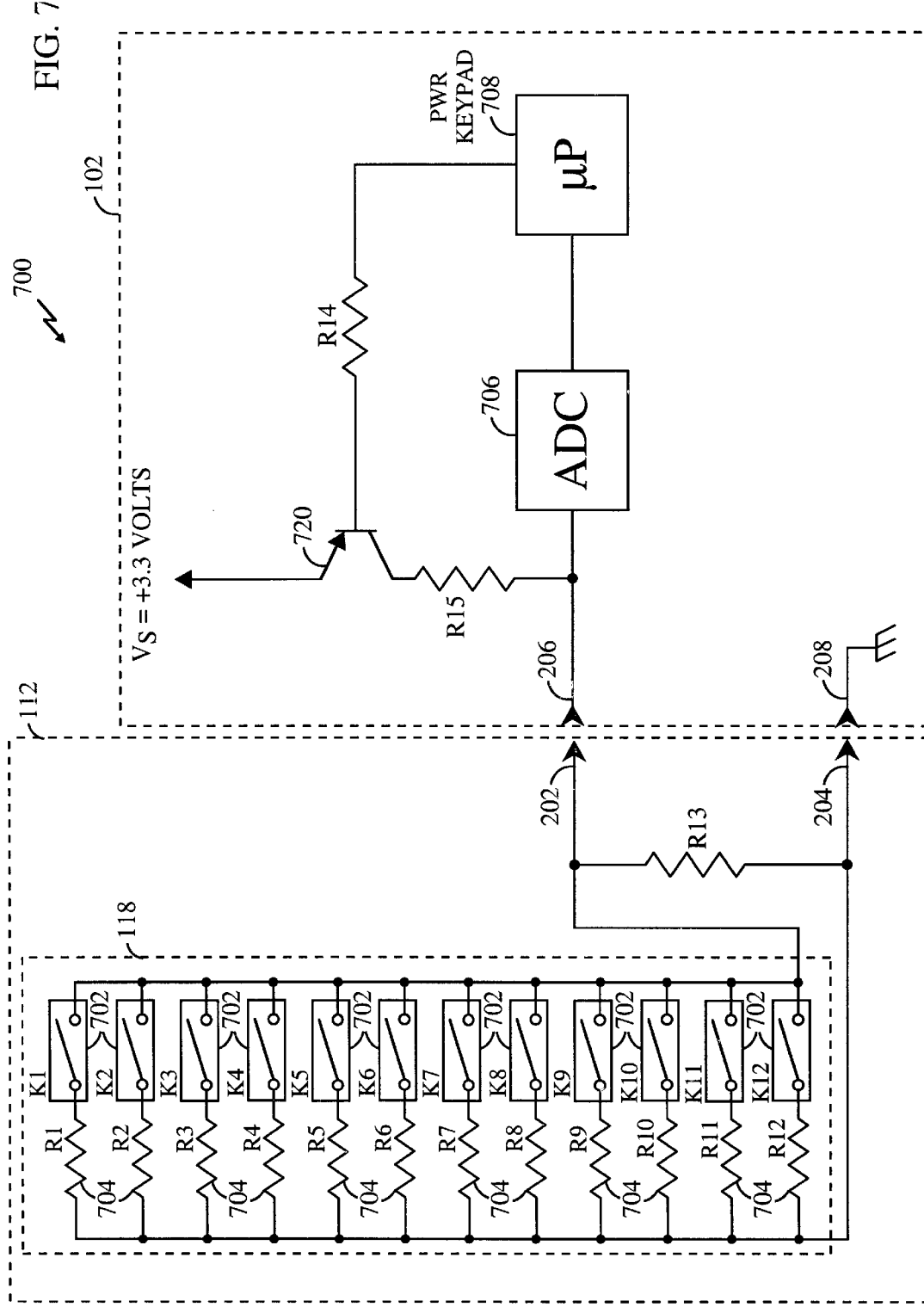
FIG. 7 is a circuit diagram illustrating the detection of the open and close state of the flip cover.

The detection of the open/close state of flip cover 112 of communications device 100 is shown in FIG. 7. Circuit 700 includes circuitry from flip cover 112 and circuitry from body 102 of communications device 100. The circuitry from flip cover 112 electrically connects with the circuitry from body 102 of communications device 100 when flip cover 112 is in the closed position. First contact 210 electrically connects with first spring loaded pogo pin 204 and the second contact 212 electrically connects with second spring loaded pogo pin 206 to allow for user input from keypad 118 to a microprocessor 708.

The circuitry found on flip cover 112 includes keypad 118 connected to first contact 210 and resistor R13 on one side of keypad 118 and to second contact 212 and the other end of resistor R13 on the other side of keypad 118. The circuitry for keypad 118 is a resistive ladder network. The resistive ladder network for keypad 118 includes a plurality of keys 702 connected to a plurality of resistors 704. Each key 702 is connected to one resistor 704. Each key 702 is also implemented as a switch. When a given key 702 is pressed, the resistance 704 associated with that key 702 provides a unique voltage level representing the pressed key 702 that distinguishes the pressed key 702 from any other key 702. The circuitry from body 102 of communications device 100 includes first and second spring loaded pogo pins 204 and 206, an analog-to-digital converter (ADC) 706, microprocessor 708, a PNP transistor 720, and two resistors R14 and R15. The second spring loaded pogo pin 206 is connected to ground. First spring loaded pogo pin 204 is connected to ADC 706 and resistor R15. First spring loaded pogo pin 204 supplies the signal from flip cover 112 to ADC 706. ADC 706 digitizes the analog signal in order that the signal may be. read by microprocessor 708. The microprocessor outputs a signal called PWR KEYPAD to the base of PNP transistor 720 via resistor R14. PWR KEYPAD allows microprocessor 708 to control keypad 118 by turning the power to keypad 118 on and off. The emitter of PNP transistor 720 is connected to a voltage source $V_S$. $V_S$ is typically +3.3 volts, but may vary from application to application. The collector of PNP transistor 720 is connected to the other end of resistor R15.

In operation, software running on microprocessor 708 enables PWR KEYPAD to output a high voltage level to the base of PNP transistor 720 through resistor R14 to turn on PNP transistor 720. When PNP transistor 720 is turned on, current flows from the voltage source $V_S$ through PNP transistor 720 to supply power to keypad 118. Resistor R15 is used to divide the signal being sent from flip cover 112 for input to ADC 706. When flip cover 112 is closed and no keys 702 are pressed, the voltage at contact 210 is a unique voltage based on the voltage drop across R13. This allows microprocessor 708 to detect that flip cover 112 is closed based on only the value of resistance R13 across the circuit. When a key 702 is pressed, the resistance associated with the pressed key 702 is resistor 704 in parallel with resistor R13. For example, the resistive value associated with key K1 is R1 in parallel with R13, key K2 is R2 in parallel with resistor R13, key K3 is R3 in parallel with resistor R13, and so on.

The values of resistors R1 through R12 are chosen to give a unique resistance value for each key 702 on keypad 118. R13 is also chosen to give a unique resistance reading when no keys 702 are pressed. When flip cover 112 is in the open position or detached from body 102 of communications device 100, ADC 706 receives as input the voltage signal from $V_S$ minus the voltage drop from the emitter to the collector of PNP transistor 720 ($V_{EC}$) and the voltage drop across resistor R15 ($V_{R15}$) Microprocessor 708, via software executing on microprocessor 708, detects the open/close state of flip cover 112 based on the distinct voltage levels associated with the position of flip cover 112.

Conclusion

While the present invention is described in terms of a combination flip phone and PDA, the present invention is also applicable to other multi-functional portable devices that employ a flip cover. The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A system for engaging different modes of operation of a device, comprising:

a first portion having a plurality of sets of electrical contacts and a plurality of resistive circuits coupled between said sets of electrical contacts, each set of electrical contacts representing a different mode of operation;

a second portion, coupled to said first portion, having a set of electrical contacts, wherein different sets of contacts are made or broken based on the relative position of said first portion to said second portion; and a processor for determining which of said plurality of sets of electrical contacts from said first portion are electrically connected to said set of electrical contacts from said second portion by determining whether said electrical connection is based on a voltage measurement from one of said plurality of resistive circuits in said first portion or a voltage measurement from said second portion, and enabling said system to operate in one of a plurality of operating modes based on said measurement.

2. The system of claim 1, further comprising an analog-to-digital converter for converting said voltage measurement to a digital signal to be read by said processor.

3. The system of claim 1, wherein one of said plurality of resistive circuits is a single resistor.

4. The system of claim 3, wherein said system operates in a third mode when said voltage measurement from said first portion is from said single resistor.

5. The system of claim 4, wherein said third mode of operation is SPEAKERPHONE mode.

6. The system of claim 5, wherein an automatic volume level increase occurs to indicate that said system is operating in SPEAKERPHONE mode.

7. The system of claim 1, wherein said first portion further comprises a keypad.

8. The system of claim 7, wherein one of said plurality of resistive circuits is a resistive ladder circuit and said voltage measurement is based on the resistance associated with a key being pressed on said keypad.

9. The system of claim 8, wherein said system operates in a first mode when said voltage measurement from said first portion is from said resistive ladder circuit.

10. The system of claim 9, wherein said first mode of operation is KEYPAD mode.

11. The system of claim 7, wherein one of said plurality of resistive circuits is a resistive ladder circuit in series with a bias resistor and said voltage measurement is based on the bias resistance and the resistance associated with a key being pressed on said keypad.

12. The system of claim 11, wherein said system operates in a second mode when said voltage measurement from said first portion is from said bias resistor in series with said resistive ladder circuit.

13. The system of claim 12, wherein said second mode of operation is SMARTPHONE mode with keypad.

14. The system of claim 1, wherein said second portion further comprises a switching circuit for controlling said first portion by turning power on and off.

15. The system of claim 14, wherein said processor controls said switching circuit.

16. The system of claim 1, wherein said first portion is a flip cover and said second portion is a personal digital assistant.

17. The system of claim 16, wherein said system operates in SMARTPHONE mode when said first portion is detached from said second portion.

18. A method for engaging different modes of operation of a device, comprising the steps of:
supplying power from a second portion to a first portion, said first portion having a plurality of sets of electrical contacts and a plurality of resistive circuits coupled between said plurality of sets of electrical contacts, each set of electrical contacts representing a different mode of operation, and said second portion being coupled to said first portion and having a set of contacts;
determining whether an electrical connection between one of said plurality of sets of electrical contacts from said first portion and said set of contacts from said second portion has been made or broken based on the relative position of said first portion to said second portion; and
enabling said device to operate in one of a plurality of modes based on the relative position of said first portion to said second portions,
wherein said determining step comprises the steps of determining whether said electrical connection is based on one of a voltage measurement from said plurality of resistive circuits in said first portion and a voltage measurement from said second portion, and converting said voltage measurement to a digital signal.

19. The method of claim 17, wherein said resistive circuit is a single resistor.

20. The method of claim 19, wherein said system operates in a third mode when said voltage measurement from said first portion is from said single resistor.

21. The method of claim 20, wherein said third mode of operation is SPEAKERPHONE mode.

22. The method of claim 21, wherein an automatic volume level increase occurs to indicate that said system is operating in SPEAKERPHONE mode.

23. The method of claim 18, wherein said first portion further comprises a keypad.

24. The method of claim 23, wherein one of said plurality of resistive circuits is a resistive ladder circuit and said voltage measurement is based on the resistance associated with a key being pressed on said keypad.

25. The method of claim 24, wherein said system operates in a first mode when said voltage measurement from said first portion is from said resistive ladder circuit.

26. The method of claim 25, wherein said first mode of operation is KEYPAD mode.

27. The method of claim 23, wherein one of said plurality of resistive circuits is a resistive ladder circuit in series with a bias resistor and said voltage measurement is based on the bias resistance and the resistance associated with a key being pressed on said keypad.

28. The method of claim 27, wherein said system operates in a second mode when said voltage measurement from said first portion is from said bias resistor in series with said resistive ladder circuit.

29. The method of claim 28, wherein said second mode of operation is SMARTPHONE mode with keypad.

30. The method of claim 18, wherein said second portion further comprises a switching circuit for controlling said first portion by turning power on and off.

31. The method of claim 30, wherein said processor controls said switching circuit.

32. The method of claim 18, wherein said first portion is a flip cover and said second portion is a personal digital assistant.

33. The method of claim 32, wherein said system operates in SMARTPHONE mode when said first portion is detached from said second portion.

* * * * *